Patented Nov. 3, 1936

2,059,570

UNITED STATES PATENT OFFICE 2,059,570

PROCESS FOR SOFTENING WATER AND DISSOLVING CALCIUM SALTS

Augustus H. Fiske, Warren, and Charles S. Bryan, Providence, R. I., assignors to Rumford Chemical Works, Rumford, R. I.

No Drawing. Application December 7, 1934, Serial No. 756,459

6 Claims. (Cl. 210—23)

Our invention relates paraticularly to a method for softening water, such, for instance, as water which is hard by reason of the presence of calcium or other salts, and for dissolving these salts in such a manner as to decrease or eliminate the hardness of the water, and particularly by the use of soluble tetraphosphates.

The object of my invention is to provide a more advantageous method for the softening of water so as to eliminate the hardness thereof, by dissolving the said salts with the aid of soluble tetraphosphates, that is to say, the tetraphosphates of the alkali metals. The tetraphosphates to which I refer are the salts of the tetraphosphoric acid discovered by Fleitmann and Henneberg in 1848 and having the following constitution, as set forth by Roscoe and Schorlemmer in their Treatise on Chemistry, vol. 1, Macmillan & Co., Ltd., 1905, page 656,—

Tetraphosphoric acid

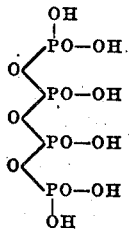

This is not to be confused with the so-called "tetraphosphate" fertilizer discovered by Stoppani in 1911, and which was made by heating the carbonates of sodium, magnesium, calcium and sulphate of sodium with natural mineral phosphates to a temperature of about 600° C., a process developed to make the mineral phosphate merely available as a plant fool. The product made by Stoppani was doubtless called "tetraphosphate" because of the fact that four ingredients were used in its preparation, in addition to the mineral phosphate present and the name applied thereto was evidently merely a trade term, his product being understood to be a double orthophosphate of calcium and sodium. The tetraphosphates produced by Fleitmann and Henneberg have the general formula $R_6P_4O_{13}$, where R signifies the base, and were made up then by fusing together pyrophosphates and metaphosphates, also orthophosphates and metaphosphates. Also, sodium tetraphosphate is referred to in the British patent to Patten, No. 8197 of 1901, as being made by a reaction between sodium bicarbonate and acid sodium pyrophosphate.

Also, according to Chem. Ztg., Rakuzin and Arseneev, 1923, pages 47, 195, prepared tetraphosphoric acid, $H_6P_4O_{13}$, and the salts forming the subject matter of the present application, are the salts of the acid there referred to. The water softening may be carried out according to our method by using the true alkali tetraphosphates made in accordance with any of the above procedures, but preferably it is carried out by utilizing an alkali tetraphosphate, and particularly sodium tetraphosphate as made in accordance with the process set forth in our co-pending application upon Process of making tetraphosphates and product thereof, Ser. No. 756,457, filed December 7, 1934, which has matured into Patent No. 2,031,827, Feb. 25, 1936.

While our invention is capable of being carried out in many different ways, for the purpose of illustration we have described hereinafter only certain embodiments of our invention.

The water softener made in accordance with our invention may be applied in such a manner as to soften the water containing soluble calcium salts with or without the presence of other soluble salts, as, for instance, magnesium salts, for the following uses:

As a water softener by keeping the alkali earth bases in a soluble condition.

In laundries to save soap by combining with the alkali earth bases in the washing water.

In deliming leather as in the tanning industry.

In dissolving the lime compounds which may occur in soiled textiles.

To prevent deposits of alkali earth salts forming in hot water systems.

To prevent deposits of alkali earth compounds in steam boilers and their feed lines.

To prevent deposits of alkali earth compounds in automobile water cooling systems.

To prevent the formation of alkali earth bases as precipitates in the water to be frozen in artificial ice machines.

To prevent the formation of alkali earth precipitates on the outside of cans from the cooling water of the canning industry.

To prevent streaky dyeing in textiles by keeping any alkali earth compounds in a condition of solubility.

Preventing the formation of soap spots on the cloth in dyeing.

To clean cement or brick walls from lime deposits.

As a softener for water in washing living animals or in baths for human beings.

For cleaning or washing dishes.

For softening water in which anything may be washed and thus saving soap.

Washing rayon, for instance.

Scouring wool.

Kier boiling in bleacheries.

Boiling off silk.

Causing increased penetration of dye in textiles by cleaning off traces of alkali earth compounds.

As so applied it is found that the water softening, by adding an alkali metal tetraphosphate, is much more effective than previous methods of water softening. For example, to soften the water used in laundries for the washing of fabrics, or in preventing the deposit of alkali earth compounds in steam boilers and other feed lines, with water containing soluble lime salts with or without the presence of magnesium salts, etc., we add to 1000 gallons of water containing, for instance, 48 parts by weight of calcium per million of water, in the form of soluble salts, usually sulphates, bicarbonates or chlorides, 3 pounds of sodium tetraphosphate or 3.6 pounds of potassium tetraphosphate, as made in accordance with our co-pending application aforesaid. As a result of this treatment the relatively large concentration of free calcium ions in the water is very greatly reduced or entirely eliminated by combining them into soluble only slightly ionized compounds or radicals due to the presence of the tetraphosphate. It will be found that in the softening of the water for steam boilers and feed lines the calcium and other similar compounds are prevented from being deposited to form a scale in the steam boilers and feed lines, notwithstanding the heating and concentration that takes place.

Similarly, the water may be softened in substantially the same way in connection with any of the other water softening operations, and particularly in the other industries listed above.

We have found that water may be softened in this way, in accordance with our process, much more effectively inasmuch as only three fourths as much by weight of the alkali metal tetraphosphate is required to completely soften the water as will be required of other materials previously used for such purposes. This can be readily demonstrated by a simple test of the water softening properties of these tetraphosphates. It is thus found that the alkali metal tetraphosphates are at least 33⅓% stronger and more effective for this purpose than in the case of metaphosphates, for example. This is demonstrated by the amount of the water softening substance required to be added to keep the calcium in solution. Furthermore, the tetraphosphates have been found to have a water softening effect increasing with the age of the solution for at least a day, while other water softeners do not increase their effectiveness with the increase of the time of application.

While we have described our invention above in detail we wish it to be understood that many changes may be made therein without departing from the spirit of the same.

We claim:

1. A process which comprises adding to hard water a water soluble salt of tetraphosphoric acid, $H_6P_4O_{13}$, so as to combine with an alkali earth metal to prevent the deposition of an alkali earth metal compound therein.

2. A process which comprises adding to hard water a water soluble salt of tetraphosphoric acid, $H_6P_4O_{13}$, so as to combine with calcium to prevent the deposition of a calcium compound therein.

3. A process of softening water, which comprises decreasing the free ion concentration of an alkali earth metal in hard water with a water-soluble salt of tetraphosphoric acid, $H_6P_4O_{13}$.

4. A process of softening water, which comprises decreasing the free ion concentration of an alkali earth metal in hard water with an alkali metal salt of tetraphosphoric acid, $H_6P_4O_{13}$.

5. A process of softening water, which comprises decreasing the free ion concentration of calcium in hard water with a water-soluble salt of tetraphosphoric acid, $H_6P_4O_{13}$.

6. A process of softening water, which comprises decreasing the free ion concentration of calcium in hard water with an alkali metal salt of tetraphosphoric acid, $H_6P_4O_{13}$.

AUGUSTUS H. FISKE.
CHARLES S. BRYAN.